US011356876B2

(12) United States Patent
Kurth et al.

(10) Patent No.: US 11,356,876 B2
(45) Date of Patent: Jun. 7, 2022

(54) METHOD AND DEVICE FOR GAIN ADJUSTMENT IN MOBILITY MEASUREMENTS

(71) Applicant: Apple Inc., Cupertino, CA (US)

(72) Inventors: Mathias Kurth, Dresden (DE); Siegfried Baer, Nuremberg (DE)

(73) Assignee: Apple Inc., Cupertino, CA (US)

( * ) Notice: Subject to any disclaimer, the term of this patent is extended or adjusted under 35 U.S.C. 154(b) by 929 days.

(21) Appl. No.: 15/496,531

(22) Filed: Apr. 25, 2017

(65) Prior Publication Data
US 2017/0325116 A1    Nov. 9, 2017

(30) Foreign Application Priority Data

May 9, 2016    (EP) .................................... 16168691

(51) Int. Cl.
*H04W 24/10* (2009.01)
*H04W 52/02* (2009.01)
*H04L 5/00* (2006.01)
*H04W 8/02* (2009.01)
*H04W 68/02* (2009.01)
*H04W 72/04* (2009.01)

(52) U.S. Cl.
CPC ............. *H04W 24/10* (2013.01); *H04L 5/006* (2013.01); *H04W 8/02* (2013.01); *H04W 52/0229* (2013.01); *H04W 68/02* (2013.01); *H04W 72/0446* (2013.01); *Y02D 30/70* (2020.08)

(58) Field of Classification Search
CPC ...... H04W 24/10; H04W 52/52; H04W 64/00
See application file for complete search history.

(56) References Cited

U.S. PATENT DOCUMENTS

2010/0331019 A1*  12/2010  Bhattacharjee ... H04W 52/0229
                                                            455/458
2015/0358928 A1*  12/2015  Dural ..................... H04W 52/52
                                                            370/280

FOREIGN PATENT DOCUMENTS

EP    2485523 A1    8/2012

OTHER PUBLICATIONS

European Search Report, European Patent Application EP 16 16 8691, dated Nov. 1, 2016.
Extended European Search Report, European Patent Application EP 16168691.0-1855, dated Nov. 9, 2016.

* cited by examiner

*Primary Examiner* — Faruk Hamza
*Assistant Examiner* — Alan L Lindenbaum
(74) *Attorney, Agent, or Firm* — Eschweiler & Potashnik, LLC

(57) ABSTRACT

The disclosure relates to a method for gain adjustment in mobility measurements of a user equipment (UE). The method includes: selecting a signal stream of a plurality of signal streams received from a plurality of radio cells for mobility measurements; performing a mobility measurement on the selected signal stream based on a given gain; determining a gain update of the selected signal stream based on a received signal strength measurement of the selected signal stream; and if the gain update is outside a predetermined gain range, initiating a recovery of the mobility measurement based on the gain update.

24 Claims, 9 Drawing Sheets

METHOD AND DEVICE FOR GAIN ADJUSTMENT IN MOBILITY MEASUREMENTS

REFERENCE TO RELATED APPLICATION

This application claims priority to European Patent Application No. 16168691.0, filed on May 9, 2016, which is hereby incorporated herein by reference in its entirety.

FIELD

The disclosure relates to methods and devices for gain adjustment in mobility measurements of a user equipment (UE). In particular, the disclosure relates to techniques for opportunistic gain acquisition for saving energy in mobility measurements of cellular and mobile communications such as Long Term Evolution (LTE).

BACKGROUND

The battery lifetime of mobile devices is one of key factors influencing the buying decision of users as well as their satisfaction thereafter. Against this background, device manufacturers are pushing hard to optimize the power consumption of cellular modems. The stand-by battery lifetime is essentially determined by the leakage during deep power saving as well as by periodic activity in base-band and RF (radio frequency) for paging and measurements for idle mode mobility. FIG. 1 shows a scenario where the cellular modem of a user equipment (UE) 130 performs mobility measurements on data streams 111, 121 received from two base stations 110, 120, e.g. for preparing cell reselection. Within each generation of cellular modems, the algorithms and hardware behind mobility measurements have improved in terms of efficiency. This way, the number of RF samples required for measurements has been reduced. However, the overhead for gain acquisition is still constant, so that the relative overhead has increased. In other words, for a single measurement period, an additional gain acquisition period of the same time duration is required.

In current development the modem sacrifices additional RF time and, thus, energy, in order to reacquire the RF gain before conducting the actual measurements within each measurement cycle. In particular, the modem is assuming the worst case that the RSS has changed significantly, so that the RF samples used for gain acquisition cannot be used for measurements. A design of the gain reacquisition with the worst case in mind results in constantly consuming energy for a task that is not required in most cases. Even for a mobile, the dominant use case is immobility for most users, e.g. during night times and during office hours It may thus be desirable to provide a technique for reducing energy consumption of the cellular modem by focusing on the dominant use case as described above.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
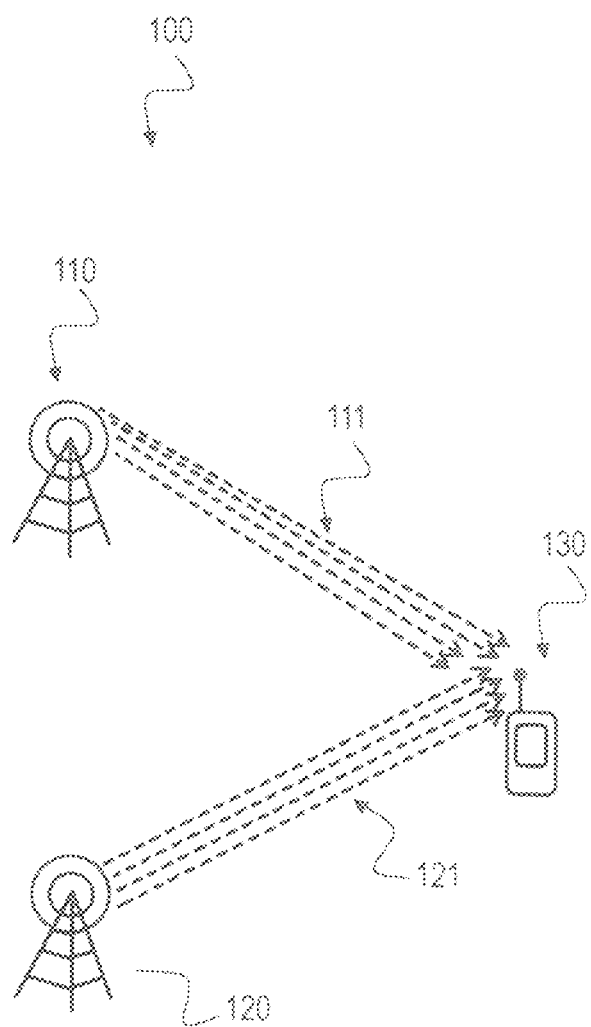
FIG. 1 is a schematic diagram illustrating a scenario where the cellular modem of a user equipment (UE) 130 performs mobility measurements.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense. The following terms, abbreviations and notations will be used herein.

3GPP: 3rd Generation Partnership Project
LTE: Long Term Evolution
E-UTRAN: evolved UMTS Terrestrial Radio Access
RSS: Received Signal Strength
BS: Base station, eNodeB,
RF: Radio Frequency,
UE: User Equipment,
OFDM: Orthogonal Frequency Division Multiplex,
NodeB: base station,
MIMO: Multiple Input Multiple Output,
TDD: Time Division Duplex
FDD: Frequency Division Duplex
FW: Firmware
RRC: Radio Resource Control
RRC_IDLE: idle state in RRC
AGC: Automatic Gain Control
SNR: Signal-to-Noise Ratio
ADC: Analog-to-Digital Converter
RSRP: Reference Signal Received Power
RSRQ: Reference Signal Received Quality
DRX: Discontinuous Reception
C-DRX: DRX connected state
LAA: Licensed Assisted Access
MBSFN: Multicast Broadcast Single Frequency Network
RAT: Radio Access Technology
HARQ: Hybrid Automatic Repeat Request It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams (or layers) in parallel in the same frequency band. The term layer is synonymous with stream or data stream. For spatial multiplexing, atleast two layers are used. The number of layers is denoted by the symbol ν. A specific layer is denoted by the symbol L. The number of layers is usually less than or equal to the number of antennas.

The methods and devices described herein after may be designed in accordance to mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals. The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in LTE FDD mode systems, e.g. LTE mode systems having a type 1 LTE frame structure. The type 1 LTE frame includes 10 sub-frames each having two slots. A basic type 1 LTE frame has an overall length of 10 milliseconds. The methods and devices described hereinafter may be applied in LTE TDD mode systems, e.g. LTE mode systems having a type 2 LTE frame structure. The type 2 LTE frame has an overall length of 10 milliseconds. The 10 ms frame comprises two half frames, each 5 ms long. The LTE half-frames are further split into five subframes, each 1 millisecond long.

The methods and devices described herein may be configured to perform mobility measurements, e.g. according to the LTE specifications 3GPP TS 36.304 version 11.6.0: "User Equipment (UE) procedures in idle mode" and 3GPP TS 36.133 version 11.8.0: "Requirements for support of radio resource management". In 3GPP E-UTRAN LTE, idle mode mobility measurements are conducted periodically within multiples of the paging cycle, the latter reaching from 320 ms up to 2.56 s. Due to macroscopic effects like shadowing and distance (path-loss) changes, among others, the received signal strength (RSS) of the signal may vary from one measurement cycle to the other. A radio frequency (RF) gain control is employed to scale the received samples into an amplitude range suitable for base-band processing. The rationale is to prevent clipping as well as providing a high signal to quantization and frontend noise ratio.

Figure 2:
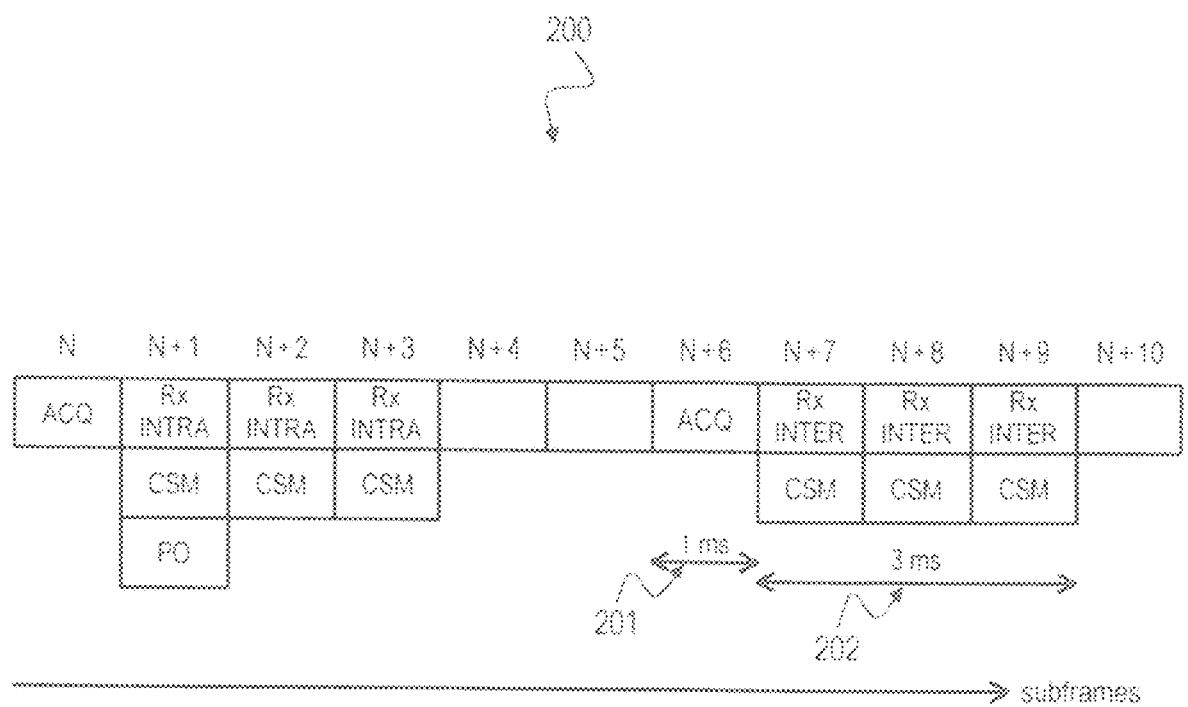
FIG. 2 is a schematic diagram illustrating scheduling of mobility measurements 200 over time according to an exemplary use case.

FIG. 2 illustrates scheduling of mobility measurements 200 over time according to an exemplary use case. In this example, FD-LTE is configured to measure neighbor cells on intra- and on one inter-frequency layer in state RRC_IDLE with 1.28 s paging cycle. FIG. 2 shows the scheduling from LTE firmware (FW) perspective: In each paging cycle, all intra-frequency activities with RF take place in sub-frames N (the paging occasion) to N+3, whereas the inter-frequency activities with RF take place in sub-frames N+6 to N+9. For the shown inter-frequency measurements, 1 ms RF sampling time is used for gain acquisition 201 (ACQ, subframe N+6) before the actual measurement 202 in the cell measurement sub-component (CSM) with length of 3 ms (sub-frames N+7 to N+9). In total, 4 ms of RF time is required with 1 ms used for gain acquisition 201, which corresponds to a relative overhead of 33%.

Figure 3:
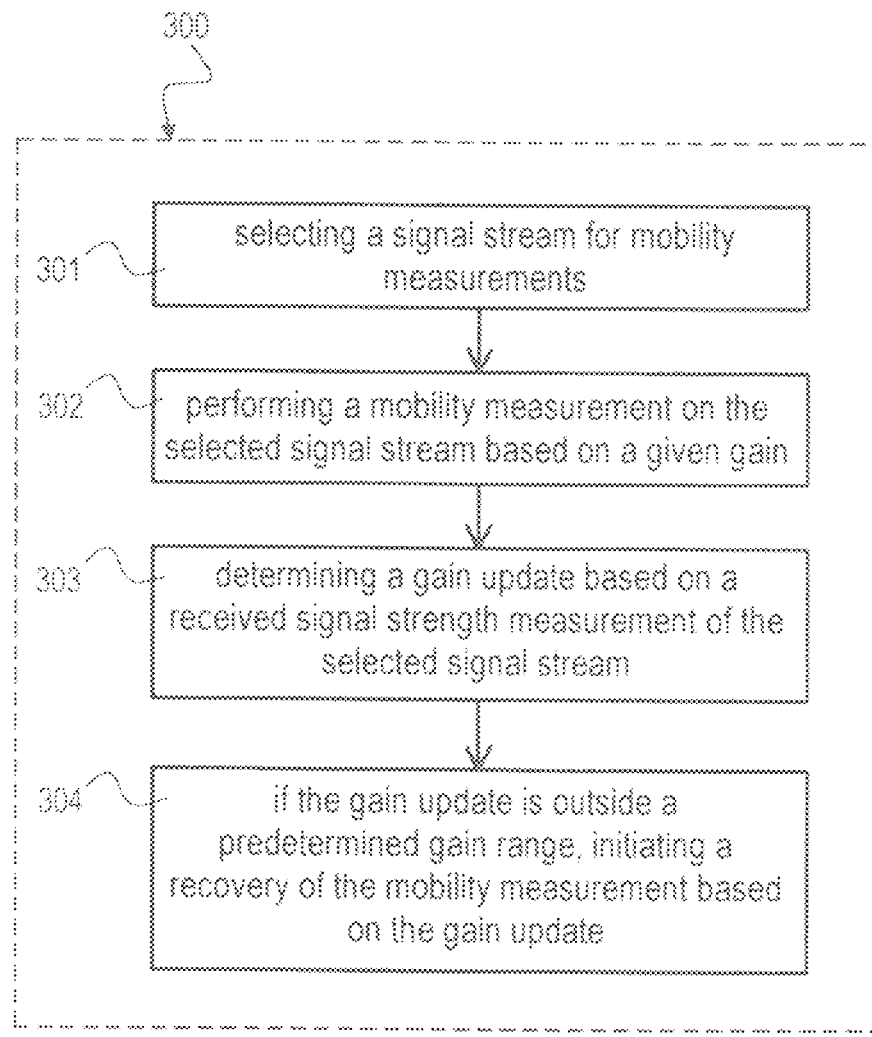
FIG. 3 is a schematic diagram of a method 300 for gain adjustment in mobility measurements of a UE according to the disclosure.

FIG. 3 is a schematic diagram of a method 300 for gain adjustment in mobility measurements of a UE according to the disclosure.

The method 300 includes selecting 301 a signal stream of a plurality of signal streams received from a plurality of radio cells for mobility measurements; performing 302 a mobility measurement on the selected signal stream based on a given gain; determining 303 a gain update of the selected signal stream based on a received signal strength measurement of the selected signal stream; and if the gain update is outside a predetermined gain range, initiating 304 a recovery of the mobility measurement based on the gain update.

The mobility measurement 302 may be performed within one sub-frame of the selected signal stream. The received signal strength measurement 303 may be performed based on at least one reference symbol comprised in the selected signal stream. The received signal strength measurement 303 may be performed after reception of a third or a half sub-frame of the selected signal stream. A sub-frame may have a duration of 1 milliseconds according to LTE. After reception of a third or a half sub-frame a reference symbol is received which can be used for performing the mobility measurement.

Initiating the recovery of the mobility measurement may include discarding a result of the mobility measurement and repeating the mobility measurement. Repeating the mobility measurement may be performed in one of succeeding paging cycles.

Initiating the recovery of the mobility measurement may include extending the mobility measurement, e.g. extending the mobility measurement to at least one further sub-frame of a same paging cycle.

Initiating the recovery of the mobility measurement may include rescheduling the mobility measurement, e.g. rescheduling the mobility measurement within a same paging cycle. The rescheduling may be performed after mobility measurements on all other selected signal streams have been performed. The rescheduling may be performed within a same paging cycle or within one of subsequent paging cycles.

The mobility measurement may include a neighbor cell measurement, a neighbor cell identification and/or a combined neighbor cell identification and measurement.

The mobility measurement may for example include an inter-frequency measurement or an intra-frequency measurement.

Determining the gain update 303 of the selected signal stream may be performed together with determining a time acquisition of the selected signal stream.

The mobility measurement 302 may be performed when the UE is in RRC idle mode or in RRC connected mode.

The method 300 implements a gain reacquisition for periodic RF activity like mobility measurements that is based on the opportunistic assumption that the worst case is rare, i.e. the RSS has not changed significantly in-between measurement cycles. Even for a mobile, the dominant use case is immobility for most users, e.g. during night times or during office hours. The method 300 may start the measurement cycle with the best case assumption, i.e. that the gain has not changed significantly compared to the most recent measurement cycle. Only in the case that this assumption turned out to be invalid for a particular cycle, based on the perceived RSS a-posteriori, the method 300 takes actions to recover 304. For example, the method 300 may repeat the measurement with the then-known suitable RF gain. Several recovery strategies may be applied corresponding to different working points on the underlying tradeoff between power consumption versus mobility performance.

Figure 4:
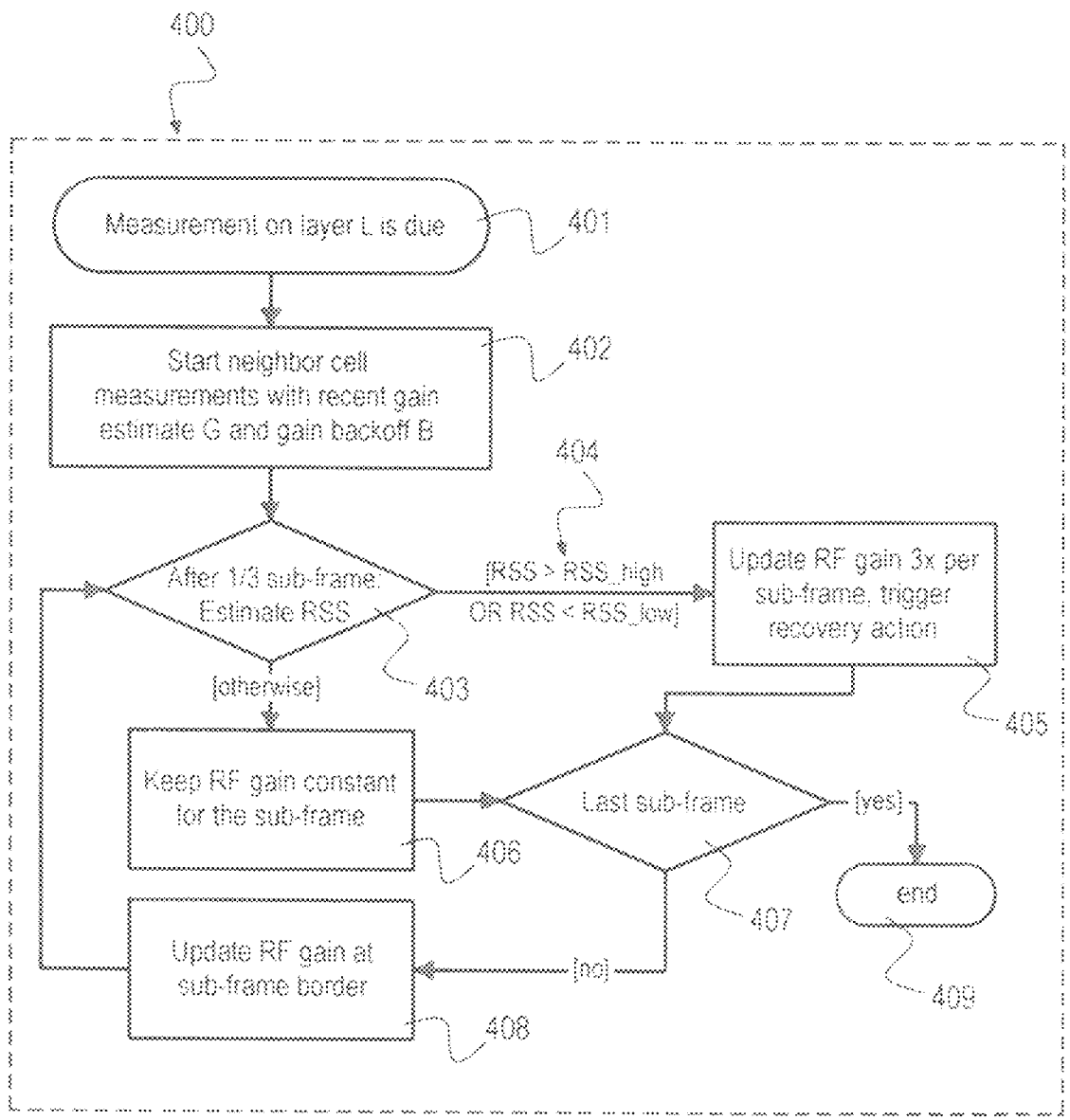
FIG. 4 is a schematic diagram of an algorithm 400 for gain adjustment in mobility measurements in a basic version according to the disclosure.

FIG. 4 is a schematic diagram of an algorithm 400 for gain adjustment in mobility measurements in a basic version according to the disclosure.

The following precondition may be applied: UE is camped on LTE and UE is in RRC_IDLE mode; The measurement layer L is configured for idle mode mobility; Layer L is configured without MBSFN sub-frames; TDD frame timing and optionally the frame configuration is known for layer L; Gain estimate G is available from the most recent measurements on layer L. For starting measurements on a newly configured layer, either legacy gain acquisition can be conducted, or a medium gain setting can be used as initial gain with the disclosed method.

The control flow is depicted in FIG. 4 describing the basic version of the algorithm without recovery. When a measurement is due on layer L 401, the following control flow is executed: The modem starts measurements on layer L using gain estimate G and a gain back-off B 402. The back-off B may be fixed, and may be selected according to the AGC target discussed below with respect to FIGS. 5 and 6. For RSS estimation, the modem partitions the sub-frame into three parts of equal length 403. After the first RSS estimate is available, the modem determines whether the RSS is within a window [RSS_low, RSS_high] 404 that would allow for reliable measurements. The window may be a predetermined gain range as described above with respect to FIG. 3. A time window of ⅓ sub-frame ensures that at least one reference symbols is received. It is understood that also a time window of ½ sub-frame can be used. If the RSS is within the window, the modem keeps the gain constant throughout the sub-frame 406. If the RSS is not within the window, the modem configures the RF to update the RF gain 405 for each RSS estimation period, i.e. three times per sub-frame. Since the measurements will not be reliable, the modem is triggering recovery actions 405. If there is another sub-frame to process, the RF gain is updated at sub-frame border 408 and the control flow continues at block 403, i.e. partitions the next sub-frame into three parts of equal length. Otherwise, the measurement terminates 409 with the last sub-frame 407. The most recent RF gain is stored 408 for the use in the next measurement cycle of the measurement layer L. Within the basic version, the recovery action of the modem is to discard the measurement result. Thus, the layer L is not updated in the considered cycle, but in the next measurement cycle assuming that recovery does not apply then.

A first variant of the algorithm 400 referred to as "adaptive recovery with measurement time extension" corresponds to the basic version with an exception in the recovery action. When recovery is triggered, the modem extends the ongoing measurement by an additional sub-frame. This way, it is ensured that a suitable gain and, thus, a reliable measurement is available already within the same measurement of the same paging cycle.

A second variant of the algorithm 400 referred to as "adaptive recovery with immediate rescheduling" corresponds to the basic version with an exception in the recovery action. When recovery is triggered, the modem reschedules the measurement on layer L within the same paging cycle. This way, it is ensured that a suitable gain and, thus, a reliable measurement is available within the same paging cycle. In order to reduce scheduling delays as well as real-time requirements, the base-band scheduler will first measure all configured layers, and re-schedule the failed layers thereafter in an interleaved fashion.

A third variant of the algorithm 400 referred to as "adaptive recovery with delayed rescheduling" is based on the assumption that the measurement cycle of layer L may be considerably larger than the configured paging cycle, i.e. not all layers are measured in every paging cycle. Based on this observation, the third variant shifts the working point of the underlying tradeoff towards more power saving than the second variant while sacrificing less mobility performance than the basic version. Within the recovery action of the third variant, the modem reschedules the measurement on layer L (one of) the next paging cycle(s).

The disclosed method or algorithm 400 reduces the power consumption of the cellular modem as described below with respect to FIGS. 5 and 6. The disclosed method or algorithm 400 can be implemented in compliance to 3GPP. The first variant has the highest requirements in terms of real-time processing the modem base-band. The working point for the mobility performance versus power tradeoff can be adjusted according to internal and customer requirements. More aggressive power saving can be achieved in the base version; the first and second variants are maintaining full mobility performance, and the third variant offers an adjustable compromise.

Figure 5:
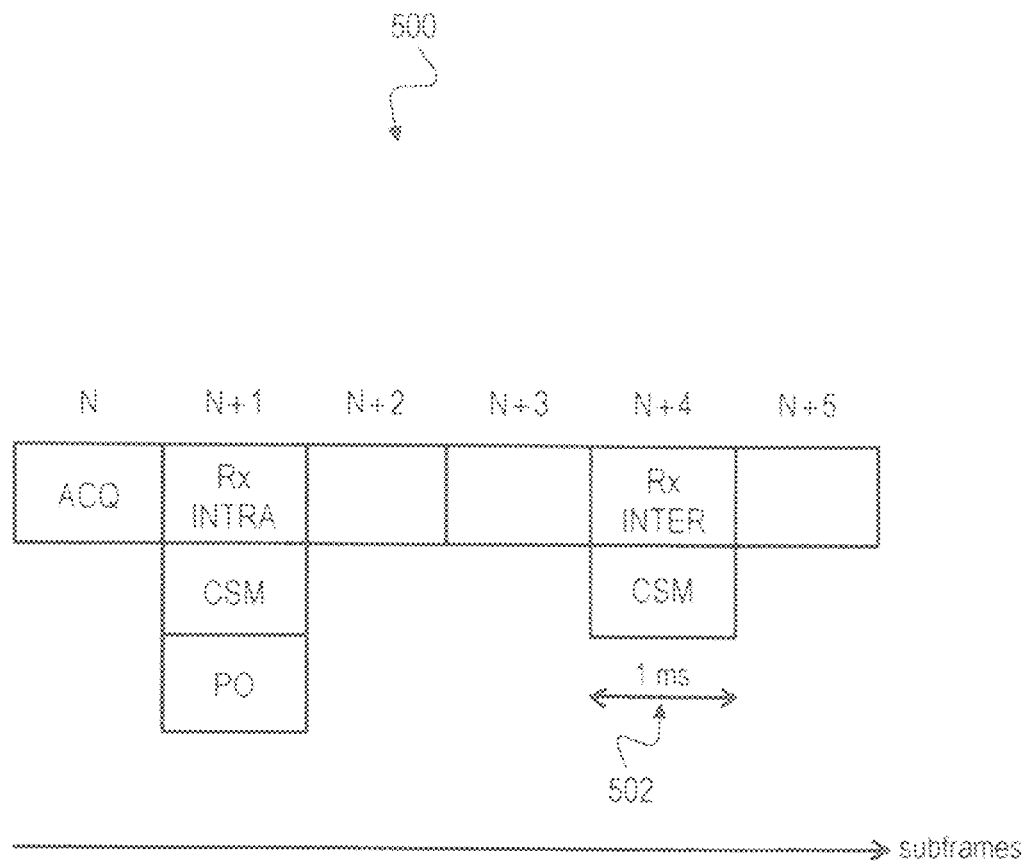
FIG. 5 is a schematic diagram of a method 500 for gain adjustment in mobility measurements of a UE for a "good case" scenario according to the disclosure.

FIG. 5 is a schematic diagram of a method 500 for gain adjustment in mobility measurements of a UE for a "good case" scenario according to the disclosure.

To reduce the power consumption, the CSM algorithms have been improved to operate on 1 ms instead of 3 ms under some circumstances (measurement bandwidth >=N25, no MBSFN sub-frames). The relative overhead of legacy acquisition corresponds to 100% in this case.

Within the presented method, the gain acquisition sub-frame is omitted for the inter-frequency measurements. As discussed below using field data, the modem will be in the good case: gain from previous measurement cycle is within a reasonable gain window and recovery is not required. The resulting scheduling is shown in FIG. 5.

The gain applied in subframe N+4 is the same gain as updated in the previous measurement cycle, i.e. in previous paging cycle. The overall RF time for inter-frequency measurement is reduced to 1 ms.

Figure 6:
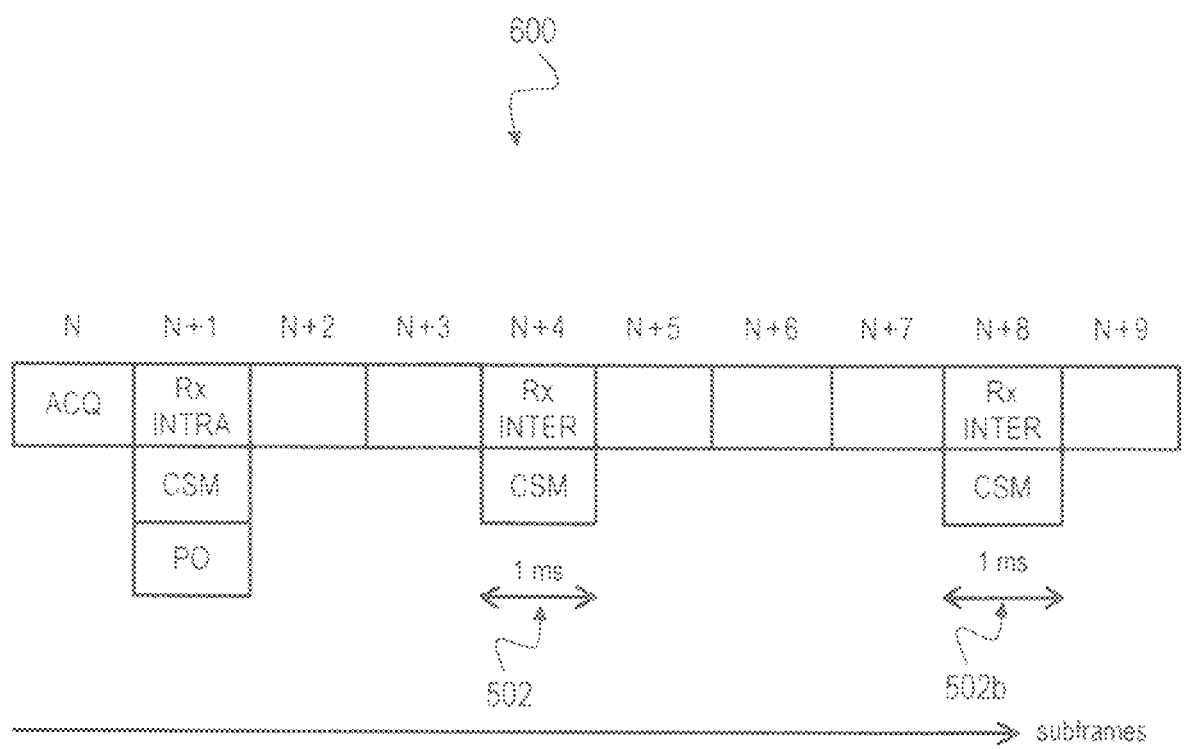
FIG. 6 is a schematic diagram of a method 600 for gain adjustment in mobility measurements of a UE for a "bad case" scenario according to the disclosure.

FIG. 6 is a schematic diagram of a method 600 for gain adjustment in mobility measurements of a UE for a "bad case" scenario according to the disclosure.

In the bad case, the gain is outside of the defined gain window. The measurement on the inter-frequency layer will be repeated immediately in the same paging cycle.

The gain update available at the end of subframe N+4 is outside of the defined gain window. Hence the measurement performed in N+4 is discarded, but repeated in N+8. As in subframe N+8 the updated gain from subframe N+4 is used, the gain is now within the gain window and the measurement performed in N+8 is valid.

Within the good case, the presented method is saving 1 ms of RF time per layer that is measured within the paging cycle. In the bad case, the measurement needs to be repeated resulting in at least 1 sub-frame of RF sampling time and additional sub-frames of base-band activity due to the scheduling delay (3 sub-frames in the considered example). As a pessimistic over-estimation, the additional costs of the bad case can be set to 10 ms RF time.

Using the field data below, one can observe an empirical probability of the bad case below 1 e-3 in a city vehicular mobility scenario with 1.28 s paging and measurement cycle. Thus, the presented method saves on average 0.98 ms of RF time per layer and per paging cycle.

The following test cased can be performed: Test case #1—Based on power waveform measurements: 1) UE is camped on LTE and UE is in RRC_IDLE mode. 2) An inter-frequency measurement layer is configured for idle mode mobility. 3) The signal conditions of the serving cell is set in a way that both intra-frequency and inter-frequency measurements are enabled. The signal level on all frequency layers is kept constant. 4) Obtain power waveform at the UE, refer as power_waveform_1. Additionally, monitor the DL HARQ feedback. 5) For consecutive paging occasion, the signal level of the considered measurement layer is varied between two power levels, a very high and a very low power level. 6) Obtain power waveform at the UE, refer as power_waveform_2. 7) If (power_waveform_1>power_waveform_2), then the UE is using opportunistic gain acquisition in variants 1, 2 or 3.

Test case #2—Based on functional evaluation: 1) UE is camped on LTE and UE is in RRC_IDLE mode. 2) An inter-frequency measurement layer is configured for idle mode mobility. 3) The signal conditions of the serving cell is set in a way that both intra-frequency and inter-frequency measurements are enabled. 4) The inter-frequency layer is configured with a cell having very low power, which does not trigger an inter-frequency reselection. 5) At time t, the power of the inter-frequency neighbor cell is raised slightly in a way that a reselection shall be triggered. 6) At time t, the tester is paging the UE on the inter-frequency neighbor cell. The tester is measuring the time t_conn1 until the UE establishes the RRC connection. 7) The procedure 1-8 is repeated with the exception that in step #5, the power is changed significantly. The estimated time in #6 shall be called t_conn2. 8) If (t_conn2>t_conn1), then the UE is using the opportunistic gain acquisition in the base variant.

Figure 7:
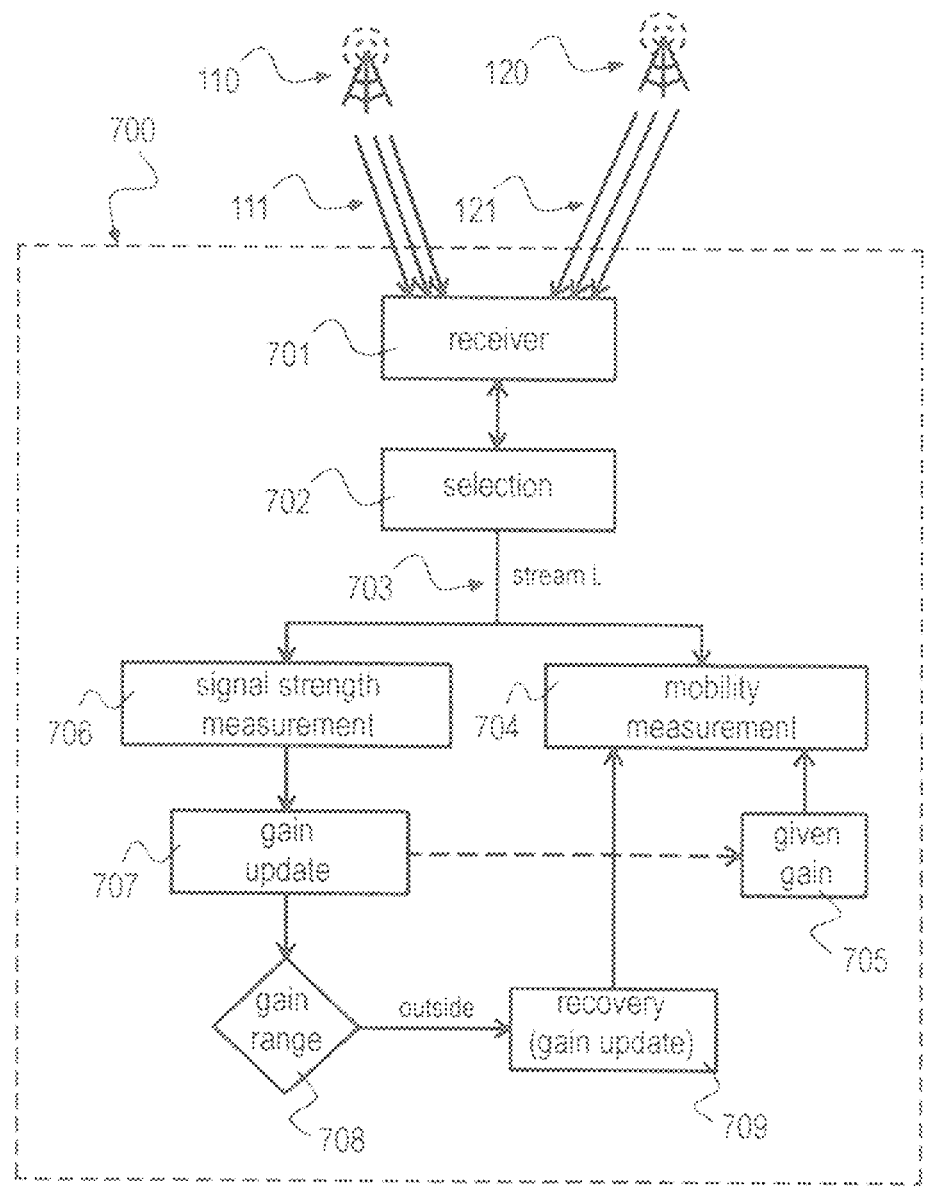
FIG. 7 is a schematic diagram of a device 700 for gain adjustment in mobility measurements of a UE according to the disclosure.

FIG. 7 is a schematic diagram of a device 700 for gain adjustment in mobility measurements of a UE according to the disclosure.

The device 700 includes a receiving circuit 701 configured to receive a plurality of signal streams 111, 121 from a plurality of radio cells 110, 120; a selection circuit 702 configured to select a signal stream of the plurality of received signal streams for mobility measurements; a mobility measurement circuit 704 configured to perform a mobility measurement on the selected signal stream based on a given gain 705; a signal strength measurement circuit 706 configured to perform a received signal strength measurement of the selected signal stream; a gain update circuit 707 configured to determine a gain update of the selected signal stream based on the performed received signal strength measurement of the selected signal stream; and a recovery circuit 709 configured to initiate a recovery of the mobility measurement 704 based on the gain update 705 if the gain update is outside a predetermined gain range 708.

The mobility measurement circuit 704 may perform the mobility measurement within one sub-frame of the selected signal stream. The signal strength measurement circuit 706 may perform the received signal strength measurement based on at least one reference symbol comprised in the selected signal stream. The signal strength measurement circuit 706 may perform the received signal strength measurement after reception of a third or a half sub-frame of the selected signal stream.

The device 700 may be implemented in a baseband circuit. The device may further process the method blocks 301, 302, 303, 304 as described above with respect to FIG. 3.

The device 700 may be implemented in cellular modems, RF transceivers, multiple RX antennas, LNAs, mixers, filters, ADCs, etc.

Figure 8:
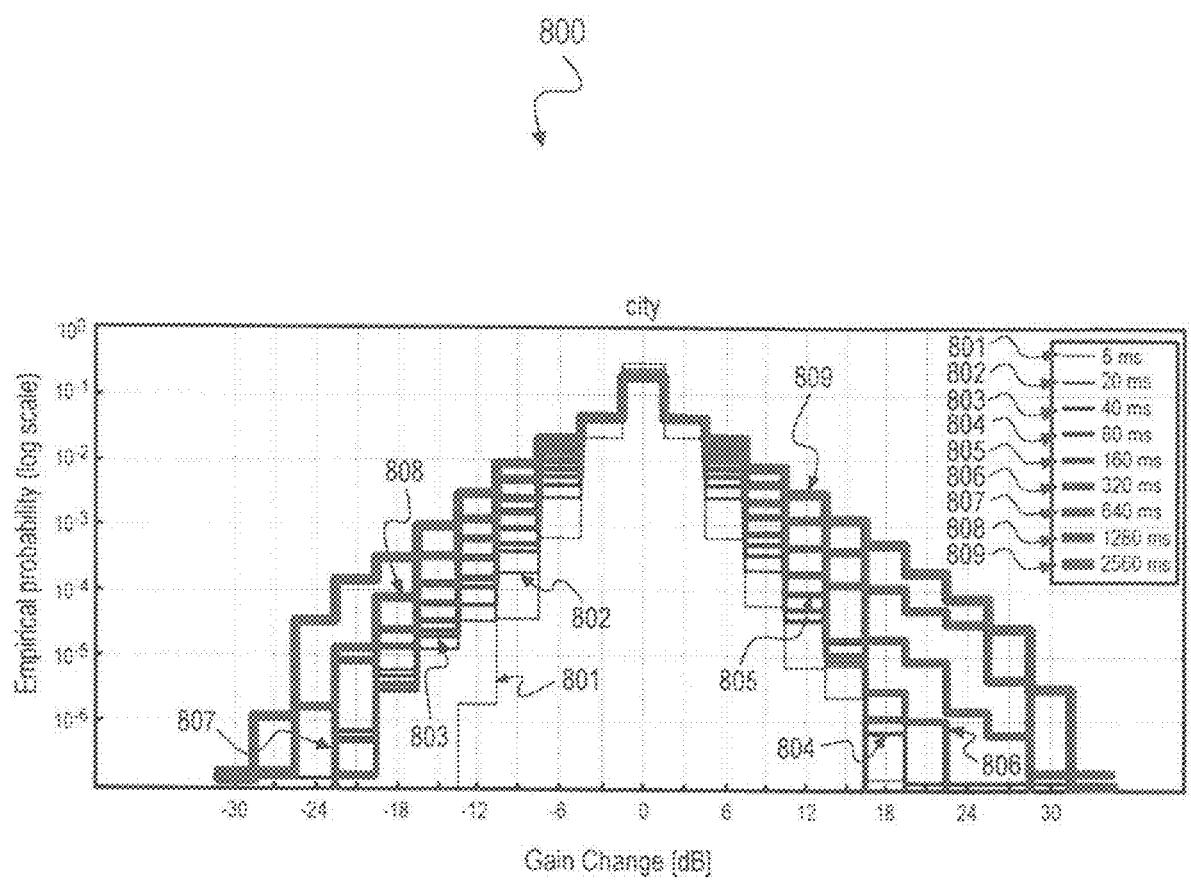
FIG. 8 is a histogram 800 depicting relative occurrence rate of gain changes (3 dB steps) over time windows 1=6 to 2560 ms for a city scenario.

FIG. 8 is a histogram 800 depicting relative occurrence rate of gain changes (3 dB steps) over time windows 1=6 to 2560 ms for a city scenario.

According to observations from live networks, the gain variability over one DRX cycle is sufficiently low allowing to for mobility measurements even under high mobility in the majority of cases. In the following, we will present observations from drive tests in an urban environment at medium speed (LTE band 3) and on the highway at higher speeds (LTE band 20), both within an operator network. They are referred to as "city" and "highway" scenario, respectively. The gain change $\Delta_l G[t]$ at time t over window l is defined as: $\Delta_l G[t]=G[t+l]-G[t]$, where $G[t]$ is the baseband gain estimate at time t. The value $\Delta_{6ms} G[t]=6$ dB means that the RF gain increased by 6 dB between t and t+6 ms or, in other words, the RSS got weaker.

In FIG. 8, the gain change $\Delta_l G[t]$ for the city scenario is shown as histogram over different time windows. For the typical paging cycle of 1280 ms 808, about 4.4e-3=0.44% of all observations have increases in gain of 9 dB over a period of 1.28 sec. Furthermore, in about 3.1e-4 of all 'city' cases, the gain did drop by −15 dB over a window of 1.28 sec. The 6 ms window (LTE measurement gap) is given as reference.

For PDSCH reception, generally a high automatic gain control (AGC) target is selected in order to maximize the signal to noise ratio (SNR) with respect to quantization and frontend noise. As a drawback, the AGC window is small and the gain has to be tracked closely. For neighbor cell identification and measurements, on the other hand, a lower SNR target for the strongest cell might be sufficient (e.g. 5 dB). The mobility decisions are solely based on RSRP and RSRQ, whereas SNR is used only for ghost cell detection.

By lowering the AGC target, the AGC window becomes wider allowing for less frequent gain tracking while keeping the instantaneous gain within the AGC window. Assuming an ideal 10-bit analog-to-digital converter (ADC), the SNR will be limited by 62 dB due to quantization. The front-end noise level is another limiting factor, which we assume to limit the SNR to not less than 45 dB. Thus, by lowering the AGC target for mobility measurements, the AGC window can be extended to +/−18 dB.

When the signal strength has changed during sleep, the observed gain may exceed the AGC window of +/−18 dB: When the signal strength increases (left side of FIG. 8), the gain has to be reduced in order to prevent saturation. When the signal strength drops (right side of FIG. 8), the gain has to be increased in order to reduce quantization and frontend noise.

Figure 9:
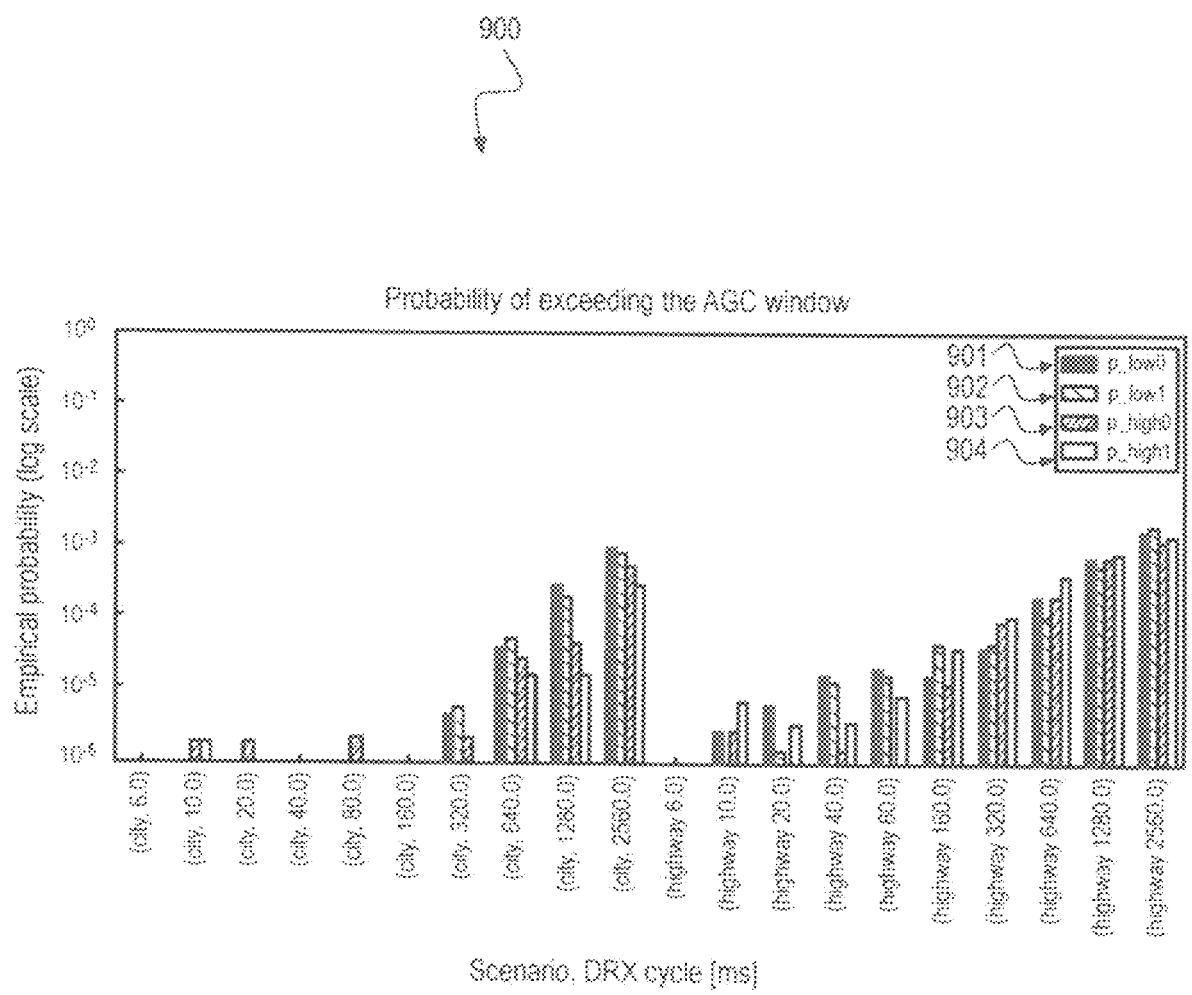
FIG. 9 is a histogram 900 depicting probability of exceeding the AGC window depending on DRX cycle and scenario.

FIG. 9 is a histogram 900 depicting probability of exceeding the AGC window depending on DRX cycle and scenario.

The probability of exceeding the AGC window is shown in FIG. 9. In the city scenario with DRX cycle 1280 ms, for example, the AGC window is exceeded with probability 2.88e-04 and 4.29e-05 on the low and high side, respectively. In other words, the expected time between two failure events due to under- and overflow is 74 min and 497 min. The respective numbers from field measurements without mobility are left out, since there is hardly any significant gain change observable outside the AGC window.

For the current 3GPP release 11 modem generation the disclosed method provides the highest benefits for neighbor cell identification and measurements on intra- and inter-frequency layers especially when the number of layers is high. The disclosed method will be even more important for upcoming 3GPP releases and associated modem generations, since the number of measurement layers will further increase, in particular for Release 12 with increased number of E-UTRA carrier monitoring (IncMon); Release 13 with licensed assisted access (LAA); Release 14 with LTE Carrier Aggregation Enhancement Beyond 5 Carriers; and the new air interface in 5G.

For the current 3GPP release 11 modem generation the disclosed methods and devices provide the highest benefits for neighbor cell identification and measurements on intra- and inter-frequency layers especially when the number of layers is high. The disclosed methods and devices will be even more important for upcoming 3GPP releases and associated modem generations, since the number of measurement layers will further increase with features like release 12 increased number of E-UTRA carrier monitoring (IncMon), release 13 licensed assisted access (LAA), release 14 LTE Carrier Aggregation Enhancement Beyond 5 Carriers and the new air interface in 5G.

For the sake of clarity, the method was presented on the example of neighbor cell measurements only. Nevertheless, the disclosed method applies as well to neighbor cell identification only operation as well as parallel neighbor cell identification and measurement. For the sake of clarity, the method was presented on the example of inter-frequency operation. Nevertheless, the method can be applied to intra-frequency neighbor cell identification and measurements when applying opportunistically combining gain acquisition and time tracking in the LTE receiver. The disclosed method can be extended to connected mode operation (with and without C-DRX) as well as to the operation in inter-RAT slave mode. In contrast to small-scale fading, significant changes of the average gain are often caused by macroscopic effects like shadowing and distance (path-loss) changes, each having an inertia of their own. Thus, the UE may use gain history and/or mobility detectors to decide upon the level of opportunism within the power versus mobility performance tradeoff. The disclosed method is not limited to 3GPP E-UTRAN LTE, but may be applied to other air interfaces, as well.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 300, 400, 500 and 600 as described above with respect to FIGS. 3 to 6. Such a computer program product may include a readable non-transitory storage medium storing program code thereon for use by a processor, the program code comprising instructions for performing any of the methods 300, 400, 500 and 600 as described above.

EXAMPLES

The following examples pertain to further embodiments. Example 1 is a method for gain adjustment in mobility measurements of a user equipment (UE), the method comprising: selecting a signal stream of a plurality of signal streams received from a plurality of radio cells for mobility measurements; performing a mobility measurement on the selected signal stream based on a given gain; determining a gain update of the selected signal stream based on a received signal strength measurement of the selected signal stream; and if the gain update is outside a predetermined gain range, initiating a recovery of the mobility measurement based on the gain update.

In Example 2, the subject matter of Example 1 can optionally include performing the mobility measurement within one sub-frame of the selected signal stream.

In Example 3, the subject matter of any one of Examples 1-2 can optionally include performing the received signal strength measurement based on at least one reference symbol comprised in the selected signal stream.

In Example 4, the subject matter of any one of Examples 1-3 can optionally include performing the received signal strength measurement after reception of a third or a half sub-frame of the selected signal stream.

In Example 5, the subject matter of any one of Examples 1-4 can optionally include that initiating the recovery of the mobility measurement comprises discarding a result of the mobility measurement and repeating the mobility measurement.

In Example 6, the subject matter of Example 5 can optionally include that repeating the mobility measurement is performed in one of succeeding paging cycles.

In Example 7, the subject matter of any one of Examples 1-4 can optionally include that initiating the recovery of the mobility measurement comprises extending the mobility measurement.

In Example 8, the subject matter of Example 7 can optionally include that extending the mobility measurement comprises extending the mobility measurement to at least one further sub-frame of a same paging cycle.

In Example 9, the subject matter of any one of Examples 1-4 can optionally include that initiating the recovery of the mobility measurement comprises rescheduling the mobility measurement.

In Example 10, the subject matter of Example 9 can optionally include that rescheduling the mobility measurement comprises rescheduling the mobility measurement within a same paging cycle.

In Example 11, the subject matter of any one of Examples 9-10 can optionally include that rescheduling the mobility measurement comprises rescheduling the mobility measurement after mobility measurements on all other selected signal streams have been performed.

In Example 12, the subject matter of any one of Examples 9-11 can optionally include that rescheduling the mobility measurement comprises rescheduling the mobility measurement within a same paging cycle.

In Example 13, the subject matter of any one of Examples 9-11 can optionally include that rescheduling the mobility measurement comprises rescheduling the mobility measurement within one of subsequent paging cycles.

In Example 14, the subject matter of any one of Examples 1-13 can optionally include that performing the mobility measurement comprises at least one of a neighbor cell measurement, a neighbor cell identification and a combined neighbor cell identification and measurement.

In Example 15, the subject matter of any one of Examples 1-14 can optionally include that performing the mobility measurement comprises performing an inter-frequency measurement.

In Example 16, the subject matter of any one of Examples 1-15 can optionally include that determining the gain update of the selected signal stream is performed together with determining a time acquisition of the selected signal stream.

In Example 17, the subject matter of any one of Examples 1-16 can optionally include performing the mobility measurement when the UE is in idle mode or in connected mode.

Example 18 is a computer readable non-transitory medium on which computer instructions are stored which when executed by a computer cause the computer to perform the method of any one of Examples 1-17.

Example 19 is a device for gain adjustment in mobility measurements of a user equipment (UE), the device comprising: a receiving circuit configured to receive a plurality of signal streams from a plurality of radio cells; a selection circuit configured to select a signal stream of the plurality of received signal streams for mobility measurements; a mobility measurement circuit configured to perform a mobility measurement on the selected signal stream based on a given gain; a signal strength measurement circuit configured to perform a received signal strength measurement of the selected signal stream; a gain update circuit configured to determine a gain update of the selected signal stream based on the performed received signal strength measurement of the selected signal stream; and a recovery circuit configured to initiate a recovery of the mobility measurement based on the gain update if the gain update is outside a predetermined gain range.

In Example 20, the subject matter of Example 19 can optionally include that the mobility measurement circuit is configured to perform the mobility measurement within one sub-frame of the selected signal stream.

In Example 21, the subject matter of any one of Examples 19-20 can optionally include that the signal strength measurement circuit is configured to perform the received signal strength measurement based on at least one reference symbol comprised in the selected signal stream.

In Example 22, the subject matter of any one of Examples 19-21 can optionally include that the signal strength measurement circuit is configured to perform the received signal strength measurement after reception of a third or a half sub-frame of the selected signal stream.

In Example 23, the subject matter of any one of Examples 19-22 can optionally include that the recovery circuit is configured to initiate the recovery of the mobility measurement based on discarding a result of the mobility measurement and triggering the mobility measurement circuit to repeat the mobility measurement.

In Example 24, the subject matter of Example 23 can optionally include that the mobility measurement circuit is configured to repeat the mobility measurement in one of succeeding paging cycles.

In Example 25, the subject matter of any one of Examples 19-22 can optionally include that the recovery circuit is configured to initiate the recovery of the mobility measurement based on initiating the mobility measurement circuit to extend the mobility measurement.

In Example 26, the subject matter of Example 25 can optionally include that the mobility measurement circuit is configured to extend the mobility measurement to at least one further sub-frame of a same paging cycle.

In Example 27, the subject matter of any one of Examples 19-22 can optionally include that the recovery circuit is configured to initiate the recovery of the mobility measurement based on triggering the mobility measurement circuit to reschedule the mobility measurement.

In Example 28, the subject matter of Example 27 can optionally include that the mobility measurement circuit is configured to reschedule the mobility measurement within a same paging cycle.

In Example 29, the subject matter of any one of Examples 27-28 can optionally include that the mobility measurement circuit is configured to reschedule the mobility measurement after mobility measurements on all other selected signal streams have been performed.

In Example 30, the subject matter of any one of Examples 27-29 can optionally include that the mobility measurement circuit is configured to reschedule the mobility measurement within a same paging cycle.

In Example 31, the subject matter of any one of Examples 27-30 can optionally include that the mobility measurement circuit is configured to reschedule the mobility measurement within one of subsequent paging cycles.

In Example 32, the subject matter of any one of Examples 19-31 can optionally include that the mobility measurement circuit is configured to perform at least one of a neighbor cell measurement, a neighbor cell identification and a combined neighbor cell identification and measurement.

In Example 33, the subject matter of any one of Examples 19-32 can optionally include that the mobility measurement circuit is configured to perform an inter-frequency measurement.

In Example 34, the subject matter of any one of Examples 19-33 can optionally include that the gain update circuit is configured to determine the gain update of the selected signal stream together with determining a time acquisition of the selected signal stream.

In Example 35, the subject matter of any one of Examples 19-34 can optionally include that the mobility measurement circuit is configured to perform the mobility measurement when the UE is in idle mode or in connected mode.

Example 36 is a user equipment (UE) comprising: a receiver circuit configured to receive a plurality of signal streams from a plurality of radio cells; and a baseband circuit configured to: select a signal stream of the plurality of received signal streams for mobility measurements; perform a mobility measurement on the selected signal stream based on a given gain; determine a gain update of the selected signal stream based on a received signal strength measurement of the selected signal stream; and initiate a recovery of the mobility measurement based on the gain update if the gain update is outside a predetermined gain range.

In Example 37, the subject matter of Example 36 can optionally include that the baseband circuit is configured to perform the mobility measurement within one sub-frame of the selected signal stream.

In Example 38, the subject matter of any one of Examples 36-37 can optionally include that the baseband circuit is configured to perform the received signal strength measurement based on at least one reference symbol comprised in the selected signal stream.

In Example 39, the subject matter of any one of Examples 36-38 can optionally include that the baseband circuit is configured to perform the received signal strength measurement after reception of a third or a half sub-frame of the selected signal stream.

In Example 40, the subject matter of any one of Examples 36-39 can optionally include that the baseband circuit is configured to initiate the recovery of the mobility measurement based on discarding a result of the mobility measurement and repeating the mobility measurement.

Example 41 is a device for gain adjustment in mobility measurements of a user equipment (UE), the device comprising: means for selecting a signal stream of a plurality of signal streams received from a plurality of radio cells for mobility measurements; means for performing a mobility measurement on the selected signal stream based on a given gain; means for determining a gain update of the selected signal stream based on a received signal strength measurement of the selected signal stream; and means for initiating a recovery of the mobility measurement based on the gain update if the gain update is outside a predetermined gain range.

In Example 42, the subject matter of Example 41 can optionally include that the means for performing the mobility measurement is configured to perform the mobility measurement within one sub-frame of the selected signal stream.

Example 43 is a system for gain adjustment in mobility measurements of a user equipment (UE), the system comprising: a receiving subsystem configured to receive a plurality of signal streams from a plurality of radio cells; a selection subsystem configured to select a signal stream of the plurality of received signal streams for mobility measurements; a mobility measurement subsystem configured to perform a mobility measurement on the selected signal stream based on a given gain; a signal strength measurement subsystem configured to perform a received signal strength measurement of the selected signal stream; a gain update subsystem configured to determine a gain update of the selected signal stream based on the performed received signal strength measurement of the selected signal stream; and a recovery subsystem configured to initiate a recovery of the mobility measurement based on the gain update if the gain update is outside a predetermined gain range.

In Example 44, the subject matter of Example 43 can optionally include that the mobility measurement subsystem is configured to perform the mobility measurement within one sub-frame of the selected signal stream.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A method for gain adjustment in mobility measurements of a user equipment (UE), the method comprising:
   selecting a signal stream of a plurality of signal streams received from a plurality of radio cells for mobility measurements;
   performing a mobility measurement on the selected signal stream based on a given gain;
   determining a gain update of the selected signal stream based on a received signal strength measurement of the selected signal stream; and
   if the gain update is outside a predetermined gain range, initiating a recovery of the mobility measurement based on the gain update.

2. The method of claim 1,
   wherein initiating the recovery of the mobility measurement comprises rescheduling the mobility measurement.

3. The method of claim 2,
   wherein rescheduling the mobility measurement comprises rescheduling the mobility measurement within a same paging cycle.

4. The method of claim 2,
   wherein rescheduling the mobility measurement comprises rescheduling the mobility measurement after mobility measurements on all other selected signal streams have been performed.

5. The method of claim 2,
   wherein rescheduling the mobility measurement comprises rescheduling the mobility measurement within one of subsequent paging cycles.

6. The method of claim 1,
   wherein initiating the recovery of the mobility measurement comprises discarding a result of the mobility measurement and repeating the mobility measurement.

7. The method of claim 6,
   wherein repeating the mobility measurement is performed in one of succeeding paging cycles.

8. The method of claim 1,
   wherein initiating the recovery of the mobility measurement comprises extending the mobility measurement.

9. The method of claim 8,
wherein extending the mobility measurement comprises extending the mobility measurement to at least one further sub-frame of a same paging cycle.

10. The method of claim 1, comprising:
performing the mobility measurement within one sub-frame of the selected signal stream.

11. The method of claim 1, comprising:
performing the received signal strength measurement based on at least one reference symbol comprised in the selected signal stream.

12. The method of claim 1, comprising:
performing the received signal strength measurement after reception of a third or a half sub-frame of the selected signal stream.

13. The method of claim 1,
wherein performing the mobility measurement comprises at least one of a neighbor cell measurement, a neighbor cell identification and a combined neighbor cell identification and measurement.

14. The method of claim 1,
wherein performing the mobility measurement comprises performing an inter-frequency measurement.

15. The method of claim 1,
wherein determining the gain update of the selected signal stream is performed together with determining a time acquisition of the selected signal stream.

16. The method of claim 1, comprising:
performing the mobility measurement when the UE is in idle mode or in connected mode.

17. A device for gain adjustment in mobility measurements of a user equipment (UE), the device comprising:
a receiving circuit configured to receive a plurality of signal streams from a plurality of radio cells;
a selection circuit configured to select a signal stream of the plurality of received signal streams for mobility measurements;
a mobility measurement circuit configured to perform a mobility measurement on the selected signal stream based on a given gain;
a signal strength measurement circuit configured to perform a received signal strength measurement of the selected signal stream;
a gain update circuit configured to determine a gain update of the selected signal stream based on the performed received signal strength measurement of the selected signal stream; and
a recovery circuit configured to initiate a recovery of the mobility measurement based on the gain update if the gain update is outside a predetermined gain range.

18. The device of claim 17,
wherein the mobility measurement circuit is configured to perform the mobility measurement within one sub-frame of the selected signal stream.

19. The device of claim 17,
wherein the signal strength measurement circuit is configured to perform the received signal strength measurement based on at least one reference symbol comprised in the selected signal stream.

20. The device of claim 17,
wherein the signal strength measurement circuit is configured to perform the received signal strength measurement after reception of a third or a half sub-frame of the selected signal stream.

21. A user equipment (UE) comprising:
a receiver circuit configured to receive a plurality of signal streams from a plurality of radio cells; and
a baseband circuit configured to:
select a signal stream of the plurality of received signal streams for mobility measurements;
perform a mobility measurement on the selected signal stream based on a given gain;
determine a gain update of the selected signal stream based on a received signal strength measurement of the selected signal stream; and
initiate a recovery of the mobility measurement based on the gain update if the gain update is outside a predetermined gain range.

22. The user equipment of claim 21,
wherein the baseband circuit is configured to perform the received signal strength measurement based on at least one reference symbol comprised in the selected signal stream.

23. The user equipment of claim 21,
wherein the baseband circuit is configured to perform the received signal strength measurement after reception of a third or a half sub-frame of the selected signal stream.

24. The user equipment of claim 21,
wherein the baseband circuit is configured to initiate the recovery of the mobility measurement based on discarding a result of the mobility measurement and repeating the mobility measurement.

* * * * *